Figure 5:
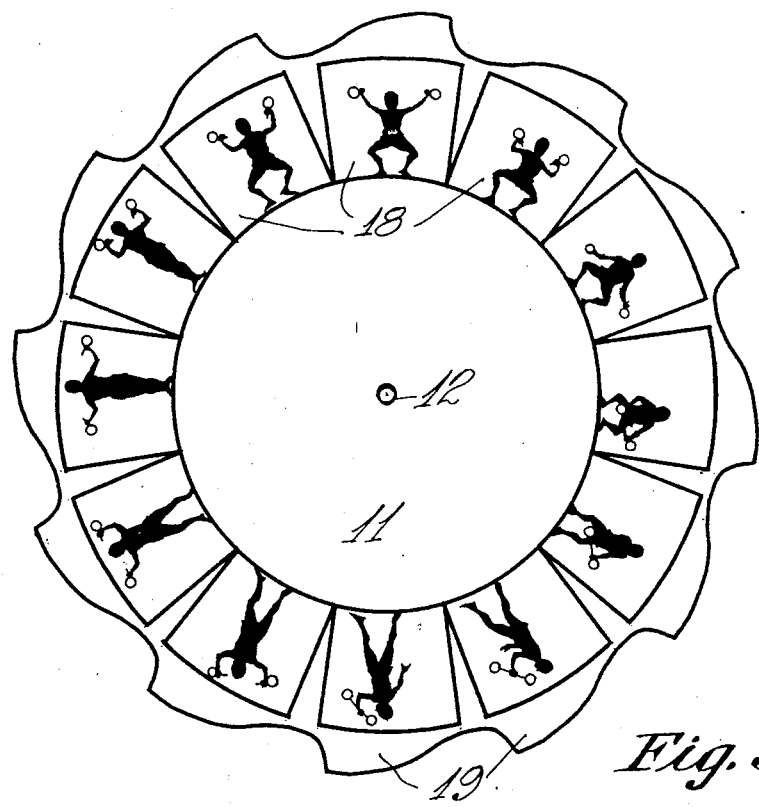

Feb. 10, 1925.
L. C. BRYANT
1,525,640
ADVERTISING DEVICE
Filed March 28, 1924
2 Sheets-Sheet 1
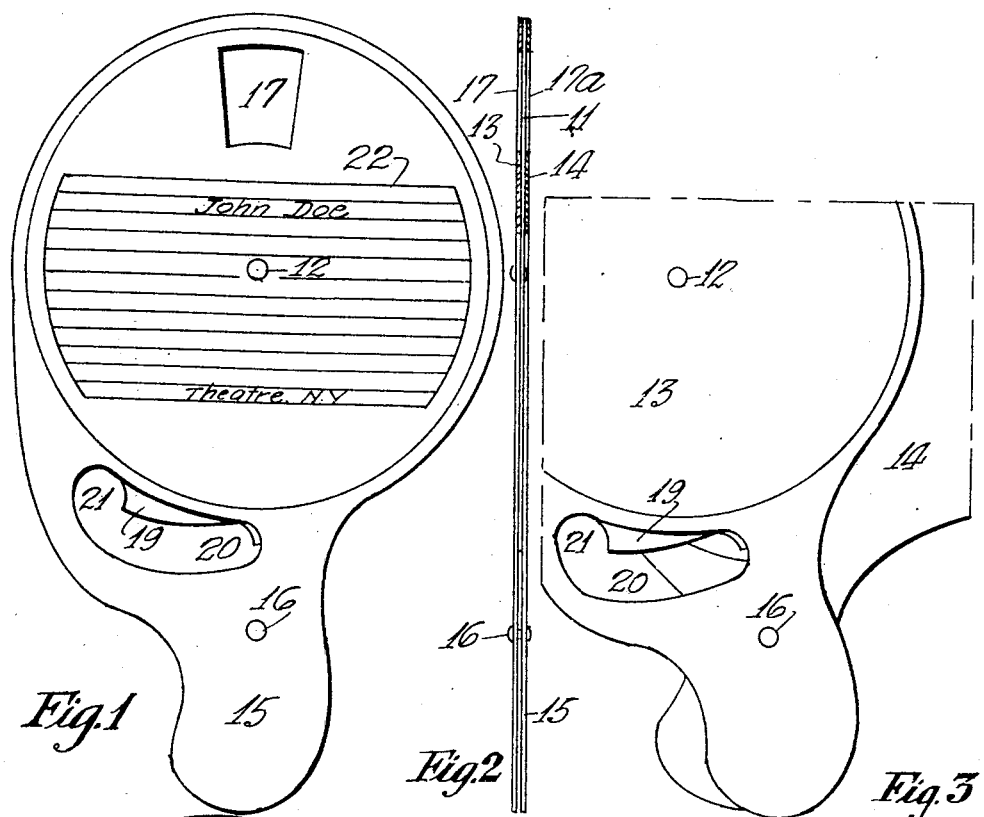
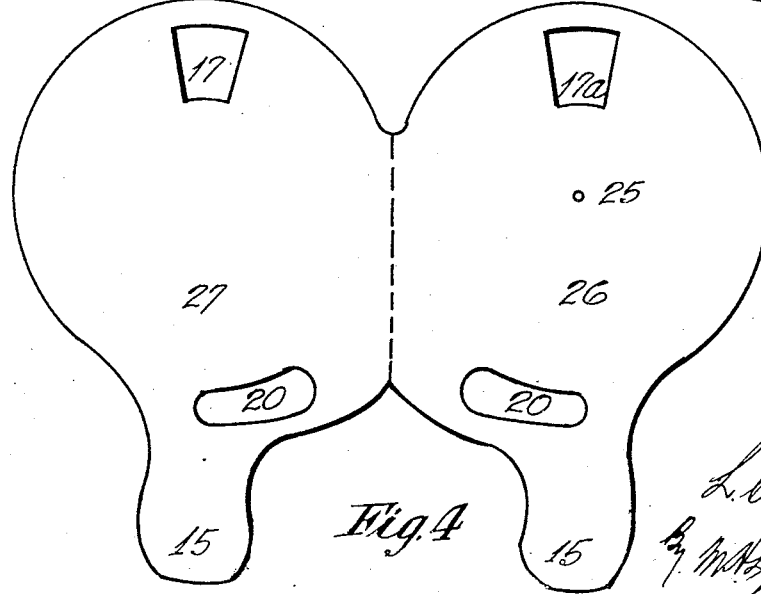
INVENTOR.
L. Chester Bryant
ATTORNEY.

Feb. 10, 1925.

L. C. BRYANT 1,525,640

ADVERTISING DEVICE

Filed March 28, 1924

2 Sheets-Sheet 2

Patented Feb. 10, 1925.

1,525,640

UNITED STATES PATENT OFFICE.

LEWIS CHESTER BRYANT, OF NEW YORK, N. Y.

ADVERTISING DEVICE.

Application filed March 28, 1924. Serial No. 702,502.

*To all whom it may concern:*

Be it known that I, LEWIS CHESTER BRYANT, a citizen of the United States, and resident of New York, in the county of New York and State of New York, have invented certain new and useful Improvements in Advertising Devices, of which the following is a specification.

This invention relates to an advertising device which takes the form of a fan and which comprises a cover that may be used for a display advertisement and embodies a moving member which may have a series of pictures or display thereon with means for bringing one of said pictures into view at a time. The device is constructed with a suitable handle and a convenient means for operating the moving member by the fingers. The device can be used as a fan and may be constructed with the cover members to expand similar to an expanding fan. The objects of the invention are to provide an attractive advertising device in which the display can be changed by the user, which is comparatively inexpensive to construct and which can be used as a utility device in the form of a fan. These and other objects of the invention will be more fully understood from the following specification and the accompanying drawings in which, Fig. 1 is a plan view of the device complete, Fig. 2 is a side elevation, partly in section, Fig. 3, is a detail showing the pivotal relation of the front and back covers of the device, Fig. 4 is another form of the device constructed like a book and Fig. 5 shows the construction of the picture disc or moving member.

In the form illustrated this invention consists of two similar discs of cardboard with a projection at one end to form a handle as shown. Between these discs a picture disc is pivotally mounted with a series of pictures around the edge. A window is cut in the cardboard cover of a size to correspond with a unit picture on the picture disc, these pictures being displayed through this window or opening in the cover, one at a time. This picture disc is rotated on its pivot by means of ratchet teeth on its edge, a tooth being provided for each picture. The handle of the device is provided with an opening through which the teeth of the picture disc project in convenient relation to the finger when the handle is gripped by the hand so that by inserting the finger through this opening the picture disc can readily be rotated. Both sides of the cover are available for advertising display.

The device itself is shaped so that it may be used as a fan and to increase its efficiency in this direction the back and front covers may be pivoted in the handle so that they can slide past each other and thus increase the effective area of the fan. This arrangement also enables the picture disc to be easily changed.

Referring to the drawings, 11 indicates the picture disc which is pivoted to rotate about 12 and is provided with a series of pictures 18 around the edge and opposite each picture a ratchet tooth 19 is located. The cover comprises two sheets of cardboard or similar material shaped according to Fig. 1 with the handle 15 and the pivot 16 holding the front sheet 13 and the back sheet 14 together as indicated in Fig. 2. An opening 17 is provided in the front cover through which one of the pictures on 11 may be exposed at a time. A similar opening $17^a$ may be provided in the back cover 14 through which a corresponding series of pictures on the back of 11 may be exposed. An opening 20 is provided in the handle for the finger of the user which when moved to the end 21 engages the tooth 19 of the picture disc 11 thus enabling the disc to be rotated one tooth and therefore one picture at a time. The slot 20 in the handle forms a protection for the teeth of the picture disc so that the teeth may not be injured or improperly moved. The disc 11 is pivoted at 12 to the front cover 13 and moves therewith. The back cover 14 being pivoted at 16 enables these parts to be spread apart as in Fig. 3. This exposes the underside of the pivot 12 so that the picture disc can readily be replaced and enables the area to be increased when used as a fan. Advertising matter may be printed on any part of the device as at 22, Fig. 1.

The modification in Fig. 4 shows the front and back covers made of one piece and folded like a book with the picture sheet pivoted to the back cover at 25. When the front 27 is folded against the back 26 the parts fall into register with the windows 17 and $17^a$ to expose the picture subjects on the disc.

This device forms an attractive advertising device for moving picture houses and the like which also serves the purpose of a fan.

Having thus described my invention, I claim:

1. In an advertising device of the class described, the combination of a disc with a series of pictures thereon, a tooth on the periphery of said disc corresponding to each picture, a cover to which said disc is pivoted provided with an opening to expose one of said pictures at a time, a handle projecting from said cover and a slot in said cover through which one of said teeth is exposed for rotating said disc.

2. In an advertising device of the class described, the combination of a disc with a series of pictures thereon, a cover in two parts enclosing said disc, said disc pivoted to one of said parts which is provided with an opening to expose one of said pictures at a time, a handle projecting from each of said parts, means pivotally securing said parts together through said handle and means for rotating said disc to expose said pictures.

3. In an advertising device of the class described, the combination of a disc with a series of pictures thereon, a tooth on said disc corresponding to each picture, a cover in two parts enclosing said disc, said disc pivoted to one of said parts which is provided with an opening to expose said pictures one at a time, a handle projecting from each of said parts, means pivotally securing said parts together through the handle and a finger slot in said handle through which one of said teeth is exposed and by means of which said disc is rotated.

Signed at New York, in the county of New York and State of New York, this 20th day of March, A. D. 1924.

L. CHESTER BRYANT.